United States Patent [19]

Corsover et al.

[11] Patent Number: 4,459,690
[45] Date of Patent: Jul. 10, 1984

[54] MULTI-BEAM OPTICAL RECORD AND PLAYBACK APPARATUS HAVING AN IMPROVED BEAM SPLITTER

[75] Inventors: Stephen L. Corsover, Philadelphia, Pa.; George J. Ammon, Medford; Charles W. Reno, Cherry Hill, both of N.J.

[73] Assignee: RCA Corporation, New York, N.Y.

[21] Appl. No.: 517,936

[22] Filed: Jul. 29, 1983

Related U.S. Application Data

[63] Continuation of Ser. No. 288,549, Jul. 30, 1981, abandoned.

[51] Int. Cl.$^3$ .................. G11B 7/00; G11B 21/10
[52] U.S. Cl. .......................................... 369/44; 369/46
[58] Field of Search ................................. 369/44–46, 369/109, 112, 119; 358/201; 350/358

[56] References Cited

U.S. PATENT DOCUMENTS

| | | | |
|---|---|---|---|
| 3,502,879 | 3/1970 | Vallese | 358/201 |
| 3,711,823 | 1/1973 | Green | 350/358 |
| 3,985,952 | 10/1976 | Adler | 369/44 |
| 4,074,085 | 2/1978 | Russell | 365/120 X |
| 4,094,010 | 6/1978 | Pepperl et al. | 365/215 |
| 4,097,895 | 1/1978 | Spong | 346/76 L X |
| 4,100,577 | 7/1978 | Naruse et al. | 369/45 |
| 4,118,735 | 10/1978 | Wilkinson | 369/44 |
| 4,167,024 | 9/1979 | Hamisch | 369/110 |
| 4,193,091 | 3/1980 | Kleuters et al. | 369/44 |
| 4,198,701 | 4/1980 | Reddersen et al. | 369/44 X |
| 4,222,071 | 9/1980 | Bell et al. | 346/76 L X |
| 4,223,347 | 9/1980 | Bouwhuis et al. | 360/77 X |
| 4,271,334 | 6/1981 | Yardy | 369/41 |
| 4,290,122 | 9/1981 | Bates et al. | 369/45 |
| 4,298,974 | 11/1981 | Tsunoda et al. | 369/45 |
| 4,321,622 | 3/1982 | Jerome et al. | 369/44 X |
| 4,337,531 | 6/1982 | Willemsen | 369/45 |
| 4,358,774 | 11/1982 | Wilkinson | 369/45 X |
| 4,397,010 | 8/1983 | Nabeshima | 369/44 |

OTHER PUBLICATIONS

"High Efficiency Multiple Beam Gratings," Lee-Applied Optics/vol. 18, No. 13, Jul. 1979.

*Primary Examiner*—Aristotelis M. Psitos
*Attorney, Agent, or Firm*—Joseph S. Tripoli; Robert L. Troike; Christopher Lyle Maginniss

[57] ABSTRACT

A wideband optical disc data record/playback apparatus is provided. The apparatus includes means for splitting the output of a single laser into multiple beams. The record beams are independently modulated and used to simultaneously record data at extremely high rates on the surface of an optical disc. The apparatus is capable of recording $1 \times 10^{11}$ bits of data on one surface of an optical disc at data rates of 100 to 300 Mb/s. In addition, a plurality of coplanar low power beams are used for playback and data verification purposes. In the playback mode a single beam is split into a plurality of low power beams and one of the plurality of beams is dithered such that the dithered beam exhibits periodic excursions in a radial direction across the surface of the disc. The dithered beam is used for tracking purposes in both the playback and record mode. In a preferred embodiment the playback beams are split by an optical grating and dithered by an acousto-optic device.

11 Claims, 3 Drawing Figures

MULTI-BEAM OPTICAL RECORD AND PLAYBACK APPARATUS HAVING AN IMPROVED BEAM SPLITTER

This is a continuation of application Ser. No. 288,549, filed July 30, 1981 and now abandoned.

The Government has rights in this invention pursuant to a Government contract.

This invention relates generally to apparatus for optically reading and recording high density information, digital or analogue, on the surface of a record medium and, more particularly, to apparatus for optically reading and recording data at extremely high data rates where multiple beams must be used.

High density optical recording systems which may be used for recording and playing back information are known in the prior art. For example, U.S. Pat. No. 4,097,895 (Spong) describes an optical disc record/playback system wherein data is recorded in the form of pits in an absorptive coating on the surface of an optical disc. In the Spong system approximately $1 \times 10^{11}$ bits of information can be stored on one side of a disc-shaped record medium having a 30 cm. diameter.

Storage systems are also known where the rate at which the information is recorded or played back may be increased two, three or more times over a Spong type system by recording or playing back multiple tracks of information simultaneously. In U.S. Pat. No. 4,094,010 to R. Pepperl et al. a multichannel optical disc storage system is described. In the Pepperl system a single light beam from a radiation source is split into a plurality of read/record beams by using a multiplicity of partially transmissive beam splitting mirrors. One of the problems with using partially transmissive mirrors to form a plurality of light beams from a single light source for record or playback is aligning the optics. In such a scheme the optics must be precisely aligned to achieve the highest packing density without creating cross talk between the beams or focused beam spots. Optical alignment can be a time consuming, tedious process. In fact, even after the beams are aligned, there is no assurance of proper operation. Thermal drifts may affect the alignment of the beam splitting optics such that the beams will be misaligned.

In another multibeam scheme described in U.S. Pat. No. 4,074,085 to James T. Russell multiple sources are used to provide a plurality of record/read beams. In this arrangement aligning the sources may be as much trouble as aligning the beams in a Pepperl system. In prior art multibeam optical systems, the optical alignment of the multiple beams could be an obstacle to the proper operation of the apparatus.

Furthermore, high density optical record/playback systems require position servo systems for maintaining high data densities during the recording process on record and for proper tracking during playback. Prior art multiple beam optical systems, such as Pepperl and Russell, describe systems for maintaining close spacing between adjacent information tracks, however, they suffer generally the same problems as the multiple beam generators described therein—the tracking function is only as good as the beam alignment. If the beams are diverging at the surface of the record medium, unless every beam is being separately tracked, which adds to the complexity of the system, one tracking beam cannot be used practically to guide a plurality of beams.

In U.S. patent application Ser. No. 288,550 entitled "Multi-Beam Optical Record and Playback Apparatus" filed for C. W. Reno on July 30, 1981, a multi-track record/playback apparatus is described. In the multibeam scheme described in the Reno application an acousto-optic device is used to split the light beam from a single light source into a plurality of playback light beams and to dither one of the plurality of light beams. The acousto-optic device of the Reno apparatus is driven by a multiplicity of signals to create the plurality of beams, each of the signals being of different frequency. One problem with this arrangement is that the split-out light beams are shifted in frequency by the acousto-optic device thus creating extraneous beat signals which may be present in the detector output. If the frequencies of the drive signals are not properly chosen, these extraneous signals can fall within the data channel and thus affect the data pick-up. In some arrangements the bandwidth of the acousto-optic device and the frequencies of the drive signals can be chosen such that the unwanted beat frequencies are outside of the band of interest. However, when numerous sub-beams are to be produced, for example, in a recorder having nine beams, the bandwidth of the acousto-optic device may not be wide enough to eliminate all unwanted beats from the band of interest.

In accordance with the principles of the present invention, a multibeam optical record/playback apparatus which obviates the above-mentioned problems is provided.

In accordance with one aspect of the present invention a data retrieval system for recovering data from a record medium where the data has been recorded in a multiplicity of separate tracks on a surface of the record medium is provided. The system comprises means for supporting the record medium and a light source for providing a beam of light. Further, the system includes means for splitting the light beam emitted by the source into a plurality of light beams and for dithering one of the plurality of light beams such that the dithered beam exhibits periodic excursions orthogonal to the length of the tracks. In addition, the plurality of light beams is directed toward the surface of the record medium by a means for directing. A means for focusing is arranged to focus the light beams as spots on the surface of the record medium. The directing means includes means for deflecting the direction of the plurality of beams during the relative motion. The system also includes means, which is responsive to the position of the light spot of the dithered light beam on the surface of the record medium, for generating a control signal for controlling the deflecting means. The deflecting means is moved to adjust the position of the plurality of light spots in response to the control signal from the generating means. In this system an improvement is provided wherein the means for splitting and for dithering comprises an acousto-optic device and an optical grating. The acousto-optic device which is driven by a frequency modulated signal produces the dithered light beam and the grating produces a plurality of light beams.

In accordance with another aspect of the present invention a multiple beam optical information recording and retrieval system for use in recording data on and playing back data from a surface of a disc-shaped record medium, the record medium having a spiral track formed on the surface, is provided. The system comprises means for rotating the record medium, a light source for providing a beam of light and a first beam splitter for splitting the beam of light from the light source into a record beam for use in recording data and a play beam for use in retrieving data. Further, the system includes second and third beam splitters. The second beam splitter splits the record beams into a plurality of first light beams wherein each of the plurality of first light beams is of substantially equal intensity. The third beam splitter splits the play beam into a plurality of second light beams and dithers one of the plurality of second light beams such that the dithered light beam exhibits periodic excursions along a radial direction of the disc-shaped record medium. A means is provided for combining the first light beams with the second light beams. The combined light beams are directed toward the surface of the record medium by a means for directing and these light beams are then focused to a plurality of respective diffraction limited spots on the surface of the record medium by a means for focusing. Radial relative motion is established between the plurality of light spots and the surface of the record medium. In this system the directing means includes means for deflecting the direction of the combined light beams to adjust the position of the plurality of focused light spots on the surface of the record medium. The system also includes means, responsive to the position of the light spot of the dithered light beam on the surface of the record medium, for generating a control signal for controlling the deflecting means. The deflecting means is moved to adjust the position of the plurality of light spots in response to the control signal from the generating means. An improvement is provided wherein the third beam splitter comprises an acousto-optic device and an optical phase grating. The acousto-optic device which is driven by a frequency modulated signal produces the dithered light beam, and the grating produces a plurality of light beams.

Other features and advantages of the invention will be more fully understood from the following detailed description of the preferred embodiment, the appended claims and the accompanying drawing in which:

Figure 1:
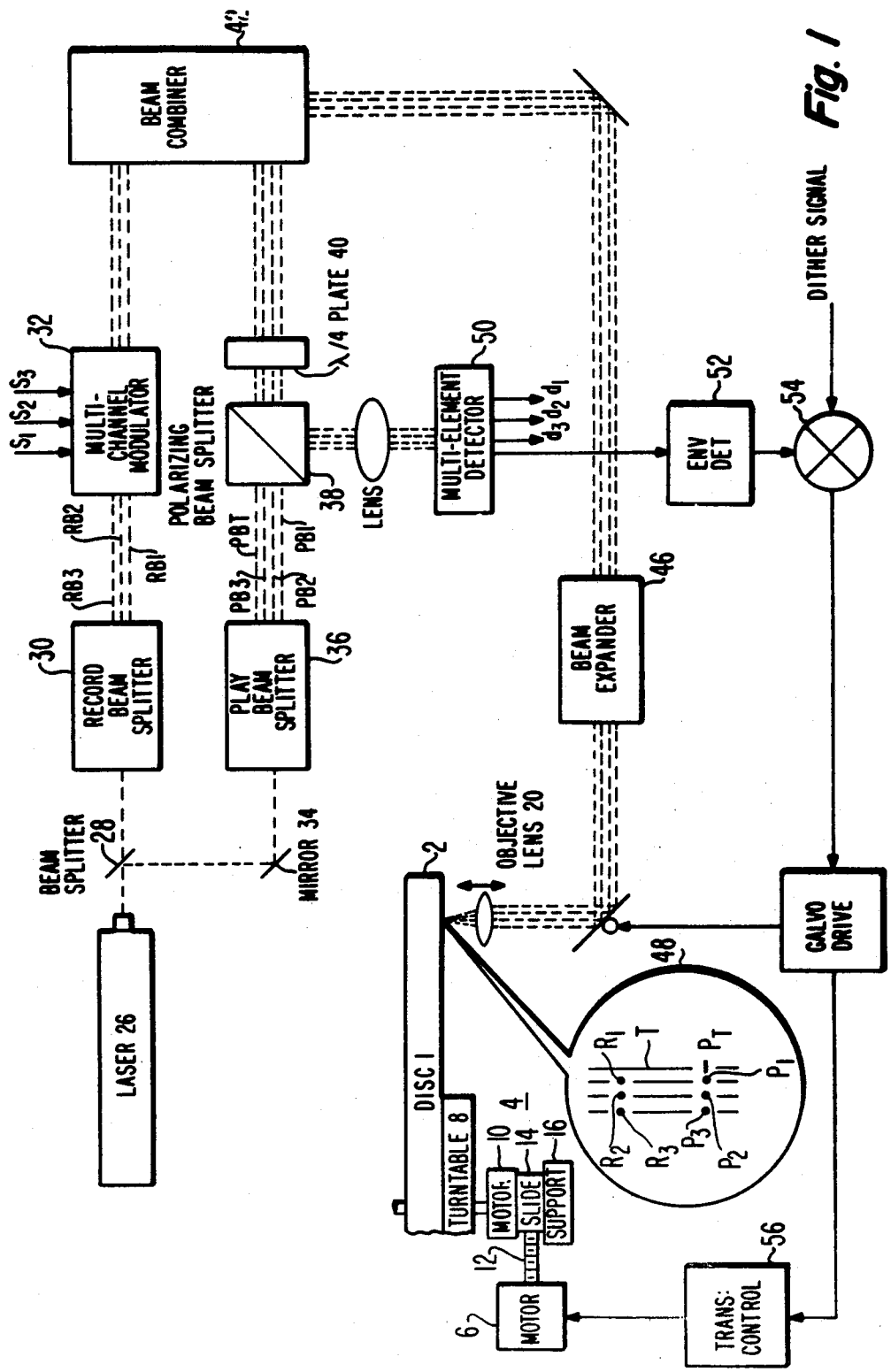
FIG. 1 illustrates a multiple beam optical record and playback apparatus in accordance with the principles of the present invention.

In accordance with the embodiment of FIG. 1, data are recorded in precisely located tracks for rapid retrieval. Recording is achieved on a light sensitive disc into which data are generally permanently recorded. Data recording is generally effected by ablation or melting. The recorded information is available immediately without further processing of any kind.

A disc 1 as illustrated in FIG. 1 is formed having a light sensitive surface 2 upon which ablative recording by the thermal effects of a focused laser beam may be made. In the embodiment described herein, the surface may be non-reflective for best results. A preferred disc for ablative recording is disclosed in U.S. Pat. No. 4,222,071 issued to A. E. Bell et al. Disc 1 may be preformatted with a spiral track (illustratively, the spiral track may comprise a series of closely spaced pits) having successive, spaced-apart track convolutions. These track convolutions which may illustratively be approximately 1 um wide and spaced approximately 4 um apart form a guide track for use in guiding a tracking beam during subsequent recording and play back. This spiral track which will be used primarily for tracking may contain overhead information such as, for example, synchronizing signals, address information and the like.

To provide optical scanning of the surface 2 of disc 1 transport stage 4 is moved linearly by motor 6 at a rate in accordance with the requirements of the desired recording or playback mode while disc 1 is rotated on turntable 8 by motor 10. Transport stage 4 comprises a tracking motor 6 and a feed screw 12 adapted to be rotated in response to rotations of motor 6. Feedscrew 12 is in mesh engagement with slide 14. When motor 6 is activated so that, for example, feedscrew 12 turns in a clockwise direction, slide 14 will move radially to the right on support 16. Furthermore, if the feedscrew 12 is made to rotate in a counter-clockwise direction slide 14 will move radially, for example, to the left. Slide 14 may be moved at several different rates of speed during various modes of operation. By means of a motor drive signal which will be described in more detail herein slide 14 may be moved (i.e., coarse tracking movements) such that the light beams focused by objective lens 20 on surface 2 falls within a few tracks of a desired track location. Fine tracking movements, on the other hand, may be achieved by deflecting the light beams exactly to a desired track by a galvanometer controlled mirror 22. In this arrangement the galvanometer causes mirror 22 to move about an axis that is parallel to the surface of the mirror for deflecting the impinging light beams onto surface 2 of disc 1 so that the light spots that are formed by lens 20 may be guided along a selected path on surface 2. Mirror 22 is actuated in response to control signals from galvo drive 24. The control signals which are supplied by galvo drive 24 will be described in greater detail herein.

In operation the light output of light source 26 (illustratively, an argon type laser emitting a monochromatic light beam of a wavelength of 488 nm) is split by beam splitter 28 into a record beam and a play beam (illustratively, 95% of the light beam from laser 26 passes through splitter 28 in a record beam path and 5% is reflected in a play beam path). The record beam passes through to record beam splitter 30. Beam splitter 30 efficiently divides the single record beam into a plurality of separate, equal amplitude, coplanar beams (illustratively, three beams, RB1, RB2, RB3). The equal amplitude beams are then passed through multichannel modulator 32 which independently impresses each beam RB1, RB2, RB3 with the information $S_1$, $S_2$, $S_3$ to be recorded. Illustratively, beam splitter 30 may comprise a phase grating for splitting the single beam into three equal amplitude beams.

The play beam is reflected by mirror 34 to pass through to play beam splitter 36. Beam splitter 36, which will be described in greater detail herein, efficiently divides the single play beam into a plurality of separate, equal amplitude, coplanar beams (illustratively, four beams, PB1, PB2, PB3, PBT). The polarization of low power play beams PB1, PB2, PB3, PBT is set to allow them to pass through polarizing beam splitter 38 on a first pass. The beams from splitter 38 pass through quarterwave plate 40 to beam combiner 42. In beam combiner 42 the modulated record beams are merged with the low power play beams. Beam combiner 42 aligns the record and play beams so that they can be passed through a common optical system to disc surface 2.

The beams from combiner 42 are reflected by mirror 44 to pass through beam expander 46 where they are expanded to provide the magnification necessary to fill objective lens 20 and allow the formation of diffraction limited spots on surface 2 of disc 1.

As shown in inset 48 of FIG. 1, the record beams RB1, RB2, RB3 are focused on surface 2 as record spots $R_1$, $R_2$, $R_3$ respectively. Record spots $R_1$, $R_2$, $R_3$, are aligned on disc 1 to form closely spaced (illustratively, 1 um) parallel information tracks during the recording process. These spots have sufficient power to ablate or melt the absorptive coating on the surface of disc 1 to form pits whose reflectivity is much higher than the normally non-reflective surface. The play beams PB1, PB2, PB3 are focused as spots $P_1$, $P_2$, $P_3$ respectively and are aligned to be colinear with the recorded information tracks at a point where they allow readout of the data just after recording (illustratively, the play spots are positioned to land approximately 40 um behind the record spots).

Simultaneously, play beam PBT which is to be used for tracking is focused by objective lens 20 to form a diffraction limited spot $P_T$ on the surface of disc 1. When play beam PBT is divided out by beam splitter 36 it is dithered (the operation of beam splitter 36 will be described in more detail herein) such that light spot $P_T$ exhibits periodic excursions in a radial direction across the surface of disc 1. As mentioned above disc 1 has been preformatted with spiral track T. Light beam PBT which is aligned with both the play beams PB1, etc., and record beams RB1, etc. provides a beam which may be used for tracking the guide track T, thus aligning the record beams in proper relationship during recording and the play beams in proper relationship during playback, both being related to the guide track T. The operation of dither tracking will be explained herein.

Light from the playback spots is reflected by the recorded pits on the disc and passed back through the optical system to the polarizing beam splitter 38. At this point, the light polarization of the play back light beams has been retarded by half a wave (i.e., two passes through quarterwave plate 40) and the light is directed to the multielement detector array 50. The changes in disc reflectivity introduced during recording are converted into electrical signals $d_1$, $d_2$, $d_3$ representative of the recorded information $S_1$, $S_2$, $S_3$ respectively. Playback during record is used to verify that the information recorded has been recorded properly. When errors are detected the data is rerecorded until no errors are detected. In normal playback the data signals $d_1$, $d_2$, $d_3$ are delivered to suitable processing electronics (not shown) for subsequent signal processing.

The operation of the tracking control will now be explained. The playback light beam PBT that impinges as light spot $P_T$ upon guide track T is dithered periodically in a direction perpendicular to the track path. Illustratively, a fifteen (15) KHz dither signal is used to wobble beam PBT. Dithering light beam PBT produces an amplitude modulated signal on detected output signal $d_t$. Detector 52 strips the A.M. portion of signal $d_T$. This stripped off signal is coupled to multiplier 54. When the spot $P_T$ is centered on guide track T the envelope of detector output has an amplitude modulation of twice the dither signal frequency (illustratively, 30 KHz). If the spot $P_T$ is off to one side of the track, the output of detector 52 is at the dither frequency rate and of a particular phase. If the spot is off to the other side of the track, the rate is at the dither frequency but 180° out of phase with the previous case. In multiplier 54 the output from detector 52 is multiplied by the reference signal used to dither the tracking spot. When the spot is centered on track T, no error signal (ie., dc component) is produced from multiplier 54. In the off track cases the output of multiplier 54 provides an error signal (i.e., dc component) of one polarity when the spot is off center in a first direction and of opposite polarity when the spot is off center in a direction opposite to the first. The amplitude of the error signal is proportional to the amount of mistracking which allows proportional control for tracking purposes. The error signal is fed to galvo drive 24 which moves galvanometer controlled mirror 22 to maintain the spot on track. As the average position of mirror 22 increases to a point just short of where the galvanometer cannot deflect the beam any more stage 4 is moved to maintain the average position of the galvanometer centered about its deflection range. A galvo position control signal is delivered to translation control 56 which in turn provides a dc signal to motor 6 to move slide 14.

Figure 2:
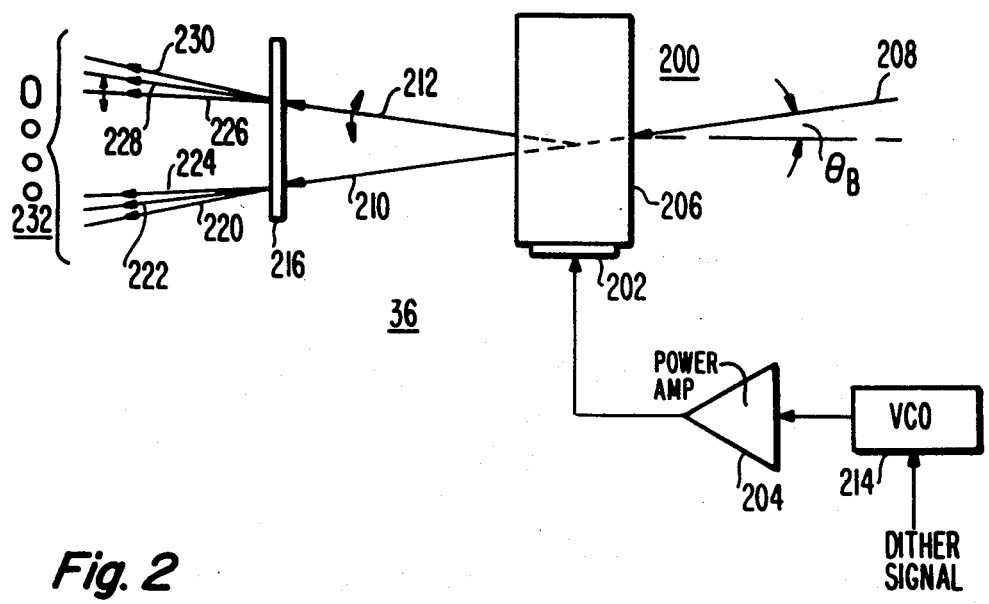
FIG. 2 shows one embodiment illustrating the play beam splitter of FIG. 1 of the present invention.

Play beam splitter 36 of FIG. 1 will now be described with reference to FIGS. 2 and 3. Referring to FIG. 2 play beam splitter 36 comprises an acouso-optic device 200 or Bragg device. Illustratively, device 200 may be an Isomet 1250-C. Device 200 is provided with an electromechanical transducer 202 which is connected to power amplifier 204. When a signal is applied to transducer 202 acoustic waves of the frequency of the applied signal are produced in the medium 206 of the device which may be, for example, glass. If the playback light beam 208 is incident on the device at the Bragg angle $\theta_B$ it will be deflected by the acoustic waves propagating through the device. The magnitude of the deflection angle is proportional to the frequency of the signal applied and the intensity of the radiation beam is determined by the amplitude of the applied signal.

When acousto-optic device 200 is driven by a substantially mono-frequency signal the incident beam 208 will be diffracted into a zero order beam 210 and a first order beam 212. If the drive signal is frequency modulated the deflected first order beam will exhibit periodic excursions at the rate of the frequency of modulation.

In operation acousto-optic device 200 is driven by a frequency modulated signal which is varied at the rate of the dither frequency. The frequency is chosen to position beams 224 and 226 in the desired angular relationship. Illustratively, voltage controlled oscillator provides a signal which varies in frequency between 77 and 83 MHz at a 15 KHz rate. Thus beam 212 will be dithered at the dither rate.

To provide multiple beams the zero order beam 210 and the first order beam 212 are passed through a transmissive phase grating 216. Beam 210 is diffracted into a plurality of equal amplitude beams (illustratively, phase grating 216 produces three beams 220, 222, 224 of equal amplitude). Simultaneously beam 212 is diffracted into a plurality of equal amplitude dither beams (illustratively, phase grating 216 produces three dithered beams 226, 228, 230 of equal amplitude). Since only one dither beam is needed for tracking two of the beams for example, 228 and 230 may be blocked so that they do not reach the disc surface. Spots 232 represent the playback spots as they would appear on the surface of disc 1.

Figure 3:
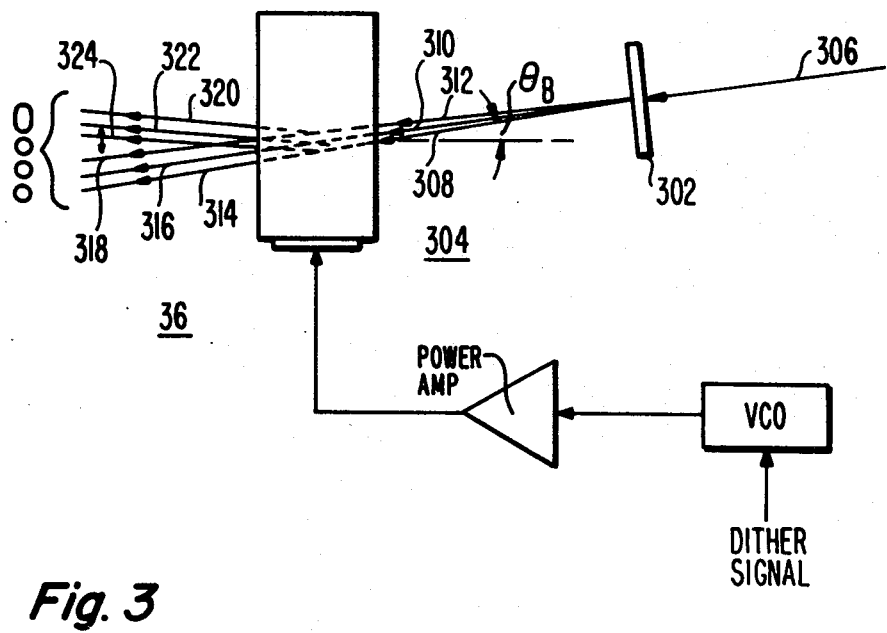
FIG. 3 shows another embodiment illustrating the play beam splitter of FIG. 1 of the present invention.

Referring to FIG. 3, a beam splitter 36 is described which is similar to the beam splitter of FIG. 2. The major difference between the structure of FIG. 3 and the structure of FIG. 2 is the positions of the phase grating 302 and the acousto-optic device 304 are interchanged. In the arrangement of FIG. 3 the incident beam 306 is incident on the phase grating 302. Phase grating 302 diffracts the incident beam 306 into a plurality of sub-beams of substantially equal amplitude (illustratively, the phase grating diffracts the light from beam 306 into three beams 308, 310, 312). The sub-beams 308, 310, 312 are diffracted by the acousto-optic device 304 to form three zero order beams 314, 316, 318 and three first order beams 320, 322, 324. If the drive signal to acousto-optic device 304 is frequency modulated at the dither rate as described with reference to FIG. 2 all three first order beams will exhibit periodic excursions at the dither rate. Since only one dither beam is needed, two of the beams, for example 320 and 322, may be blocked so that they do not reach the disc surface. It should be noted that in this arrangement only beam 308 of sub beams 308, 310, 312 is incident at the Bragg angle.

While the principles of the present invention have been demonstrated with particular regard to the illustrated structure of the FIGURES, it will be recognized that various departures from such illustrated structure may be undertaken in practice of the invention. For example, the beam splitting and dithering techniques described herein may be replaced by other techniques such as those described in the aforementioned U.S. Patent Application of C. W. Reno.

As mentioned earlier the Reno beam splitting scheme may be susceptible to beat frequency problems, especially when a large number of beams are to be used for record and playback. In the present invention the beat frequency problems are solved by driving the acousto-optic device with a signal that has a carrier frequency well above the data bandwidth. Since only one signal is used to deflect the beams any beat frequency which may be present may be generally filtered out of the data spectrum without disturbing the channel characteristics.

What is claimed is:

1. A data retrieval system for recovering data from a record medium, said data being recorded in a multiplicity of separate tracks on a surface of said record medium, said system comprising:
   means for supporting said record medium;
   a light source for providing a beam of light;
   means for splitting said beam of light into a plurality of light beams, said splitting means effecting dithering of a part of said plurality of light beams such that said part of said plurality of light beams exhibits periodic excursions orthogonal to the length of said tracks, said means for splitting including: an acousto-optic device, which is driven by a frequency modulated signal, having a single transducer, for providing a dithered light beam and an optical grating for providing a plural number of light beams;
   means for directing said plurality of light beams toward said surface of said record medium;
   means for focusing said plurality of light beams to produce spots on said surface of said record medium;
   means for establishing relative motion between said light beam spots and said surface of said record medium;
   said directing means including means for deflecting the direction of said plurality of light beams during said relative motion; and
   means responsive to the position of the light spot of one of said part of said plurality of light beams on said surface of said record medium, for generating a control signal for controlling said deflecting means;
   said deflecting means being moved to adjust the direction of said plurality of beams in response to said control signal from said generating means.

2. The system according to claim 1 wherein said optical grating is positioned between said light source and said acousto-optic device.

3. The system according to claim 1 wherein said acousto-optic device is positioned between said light source and said optical grating.

4. The system according to claims 2 or 3 wherein said optical grating is a transmissive type phase grating.

5. An information retrieval system for recovering data from a surface of a disc-shaped record medium having said data recorded along a multiplicity of successive, elongated tracks on said surface of said record medium, said system comprising:
   means for rotating said disc-shaped record medium;
   a light source for providing a beam of light;
   means for splitting said light beam into a plurality of light beams, said splitting means effecting a dithering of a part of said plurality of light beams such that said part of said plurality of said light beams exhibits periodic excursions along a radial direction of said disc-shaped record medium, said splitting means including: an acousto-optic device, which is driven by a frequency modulated signal, having a single transducer, for providing a dithered light beam and an optical grating for providing a plural number of light beams;
   means for directing said plurality of light beams toward said surface of said record medium;
   means for focusing said plurality of light beams to a plurality of respective diffraction limited spots on said surface of said record medium;
   means for effecting radial relative motion between said plurality of light spots and said surface of said disc-shaped record medium;
   said directing means including means for deflecting the direction of said plurality of light beams to adjust the position of said plurality of focused light spots on said surface of said record medium; and
   means, responsive to the position of the light spot of one of said part of said plurality of light beams on said surface of said record medium, for generating a signal for controlling the movement of said deflecting means;
   said deflecting means being moved to adjust the position of said plurality of light spots in response to said control signal from said generating means.

6. The system according to claim 5 wherein said optical grating is positioned between said light source and said acousto-optic device.

7. The system according to claim 5 wherein said acousto-optic device is positioned between said light source and said optical grating.

8. The system according to claims 6 or 7 wherein said optical grating is a transmissive type phase grating.

9. A multiple beam optical information recording and retrieval system for use in recording data on and playing-back data from a surface of a disc-shaped record medium, said record medium having a spiral track formed on said surface, said system comprising:
   means for rotating said disc-shaped record medium;
   a light source for providing a beam of light;

a first beam splitter for splitting said beam of light into a record beam for use in recording data on said record medium surface and a play beam for use in retrieving data recorded on said record medium;

a second beam splitter for splitting said record beam into a first plurality of light beams, each of said first plurality of light beams being of substantially the same intensity;

a third beam splitter for splitting said play beam into a second plurality of light beams, said third beam splitter effecting a dithering of a part of said light beams of said second plurality such that said part of said light beams of said second plurality exhibits periodic excursions along a radial direction of said disc-shaped record medium, said third beam splitter including: an acousto-optic device, which is driven by a frequency modulated signal, having a single transducer, for providing a dithered light beam and an optical grating for providing a plural number of light beams;

means for combining said first plurality of light beams with said second plurality of light beams;

means for directing said combined light beams toward said surface of said record medium;

means for focusing said combined light beams to a plurality of respective diffraction limited spots on said surface of said record medium;

means for establishing radial relative motion between said plurality of light spots and said surface of said record medium;

said directing means including means for deflecting the direction of said combined light beams to adjust the position of said plurality of focused light spots on said surface of said record medium; and means, responsive to the position of the light spot of one of said part of said second plurality of light beams on said surface of said record medium, for generating a control signal for controlling said deflecting means;

said deflecting means being moved to adjust the position of said plurality of light spots in response to said control signal from said generating means.

10. The system according to claim 9 wherein said optical grating is positioned between said light source and said acousto-optic device.

11. The system according to claim 9 wherein said acousto-optic device is positioned between said light source and said optical grating.

* * * * *